W. H. AND M. KOCH AND N. W. GALES.
TEAT CUP FOR MILKING MACHINES.
APPLICATION FILED APR. 16, 1917.

1,322,311.

Patented Nov. 18, 1919.

Inventors,
William H. Koch,
Michael Koch, and
Nicholas W. Gales, by
G.C. Kennedy
Attorney.

UNITED STATES PATENT OFFICE.

WILLIAM H. KOCH AND MICHAEL KOCH, OF INDEPENDENCE, AND NICHOLAS W. GALES, OF WATERLOO, IOWA.

TEAT-CUP FOR MILKING-MACHINES.

1,322,311.
Specification of Letters Patent.
Patented Nov. 18, 1919.

Application filed April 16, 1917. Serial No. 162,528.

*To all whom it may concern:*

Be it known that we, WILLIAM H. KOCH, MICHAEL KOCH, and NICHOLAS W. GALES, citizens of the United States of America, said WILLIAM H. KOCH and MICHAEL KOCH being residents of Independence, Buchanan county, Iowa, and said NICHOLAS W. GALES being a resident of Waterloo, Blackhawk county, Iowa, have invented certain new and useful Improvements in Teat-Cups for Milking-Machines, of which the following is a specification.

Our invention relates to improvements in teat-cups for milking-machines, and the object of our improvement is to provide means in a teat-cup to apply pressure to a teat beginning near the udder and progressively advancing toward the end to naturally and effectively strip the milk from the teat.

Figure 2:
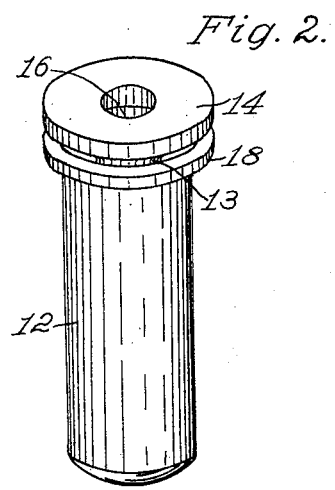
Figure 1:
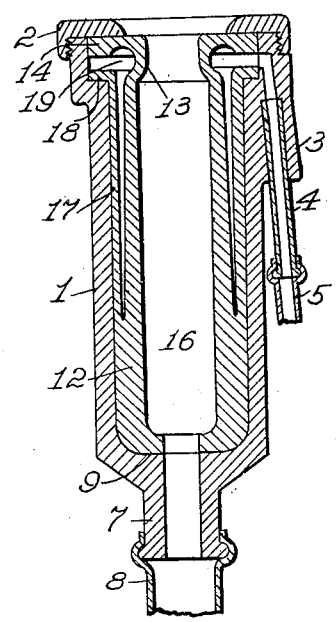

This object we have accomplished by the means which are hereinafter described and claimed, and which are illustrated in the accompanying drawings, in which Figure 1 is a central longitudinal section of our improved teat-cup and housing; Fig. 2 is a perspective view of the elastic teat-cup shown in said Fig. 1.

Similar numerals of reference denote corresponding parts throughout the several views.

In the device, shown in Figs. 1 and 2, wherein an elastic cup 12 is inclosed in a housing 1, the outer end of the housing having a threaded covering ring 2, the teat-cup 12 is lengthened sufficiently to entirely inclose the teat so as to prevent the teat from coming into contact with the interior wall of the rigid housing 1. The upper end of the teat-cup is contracted at 13, and its wall is increased in thickness from said contracted part toward its other end, and the teat-cup has an integral spaced outer sleeve-part 17 provided with an outwardly flanged extremity 18 parallel with and spaced away at 19 from the outwardly flanged end 14 of the teat-cup. A delivery tube 5 for compressed air, leads through a boss 3 and nipple 4 to the interior annular space 19 between the spaced flanges 14 and 18 of the teat-cup. Compressed air therefore acts first upon the thinner contracted upper end 13 of the teat-cup before progressively compressing the main body thereof. The contracted lower end 7 of the housing 1 is in communication with a flexible tube 8, the latter leading to a vacuum-inducing device not shown and to a receptacle for milk also not shown. The bore of the neck 7 leads into the wider hollow 16 of the teat-cup 12, providing also an interior shoulder 9 in the housing to fit the lower end of said cup 12.

When the vacuum-inducing apparatus is acting upon the air in the interior of said teat-cup, and means are provided in communication with the tube 5 to create a pulsation of air therein, the thinner contracted part 13 of the teat-cup 12 which embraces the animal's teat, is first compressed thereon, the gradually thickened walls of the teat-cup below then progressively contracting to strip the teat of milk, which flows through the bore 16 into the tube 8, thence to the milk-can. The annular space 19 allows free action of the compressed air, to equally compress the neck 13 simultaneously all around the teat, and the thick lower end of the cup 12 remains uncompressed, which permits free delivery of the issuing milk.

Having described our invention, what we claim as new, and desire to secure by Letters Patent, is:

In combination, a rigid housing, a flexible teat-cup positioned therein, said teat-cup having an integral sleeve-part encompassing its teat-receiving end only, said teat-receiving end being collapsible inwardly, and means for conducting a supply of compressed air about said collapsible teat-receiving end between it and said sleeve-part to cause the teat-receiving end to collapse initially.

Signed at Waterloo, Iowa, this 30th day of March, 1917.

WILLIAM H. KOCH.
MICHAEL KOCH.
NICHOLAS W. GALES.

Witnesses:
PEARL M. STANTON,
G. C. KENNEDY.